Aug. 25, 1953     H. M. OLSON     2,650,143
PISTON RING
Filed Oct. 1, 1951
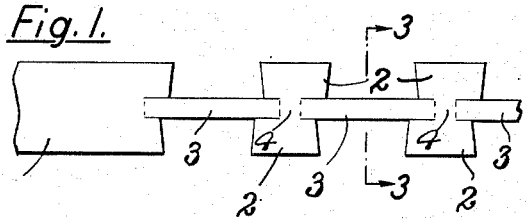
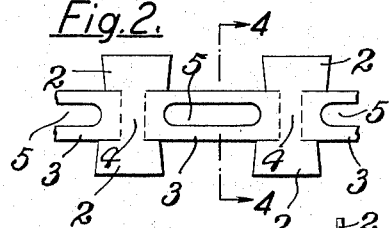
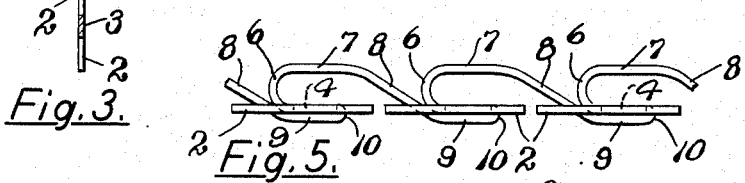
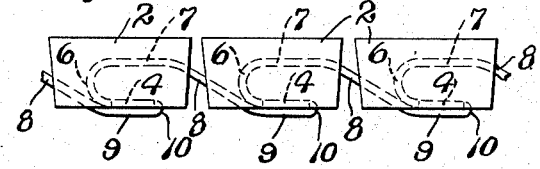
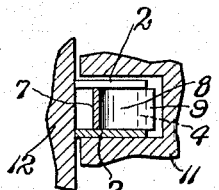
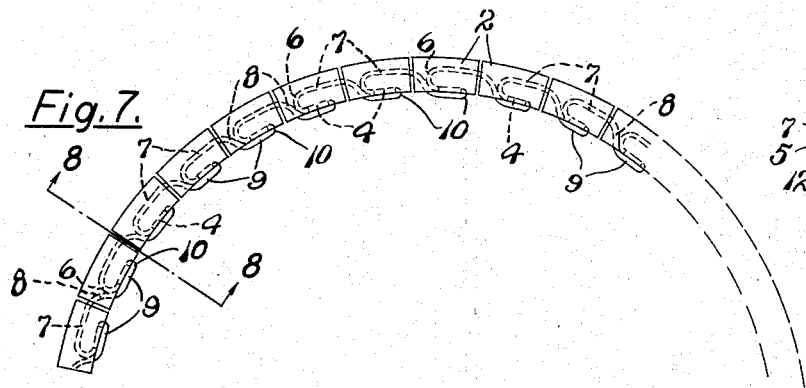
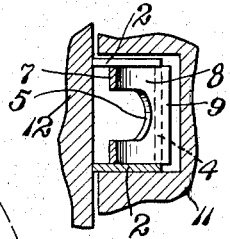
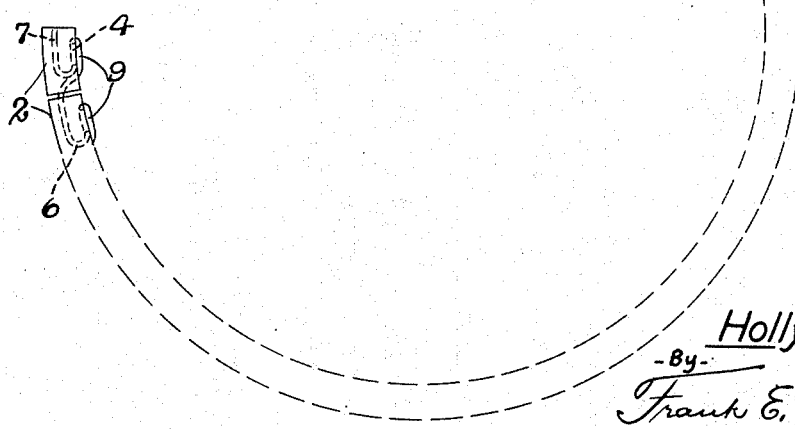
Inventor
Holly M. Olson
-By-
Frank E. Liverance Jr.
Attorney Patented Aug. 25, 1953

2,650,143

UNITED STATES PATENT OFFICE 2,650,143

PISTON RING

Holly M. Olson, Muskegon, Mich., assignor to Sealed Power Corporation, Muskegon, Mich., a corporation of Michigan Application October 1, 1951, Serial No. 249,050

5 Claims. (Cl. 309—29)

This invention relates to a circumferentially compressible piston ring, which because of its novel structure may be used for both vented oil, or unvented compression rings, said piston ring having the property of maintaining and holding straight alignment of the ring when it is compressed to its operating diameter.

Piston rings of the circumferentially compressible type have been made but, in general, have a serious weakness in common, consisting in their tendency to buckle when compressed in the ring groove of a piston ring, causing a damping effect on the ring movements within the ring groove, because of frictional contact of the upper and lower sides of the rings with the upper and lower sides of the grooves. Steel piston rings of the circumferentially compressible type include a very large number of flexibly joined segments, each having an upper and lower land, the outer edges of which engage the walls of the piston in which installed; and when such ring is subjected to compression there is buckling except when confined between the upper and lower sides of a piston ring groove. Such buckling is held by the piston ring groove but the ring bears with pressure against the upper and lower sides of the groove, generating friction which interferes with the free movement of the ring. The buckling tendency in addition becomes more pronounced and aggravated with narrow compression rings than with the greater width oil rings.

With my invention, the circumferentially compressible ring which I have produced has inherently within it a guide means as an integral part of the ring which will maintain the ring in straight alignment when compressed whereupon, the ring remaining flat and straight within a ring groove, performs freely therewithin. Such reinforcement and maintenance of the compressible ring to flat and straight condition, maintaining alignment under compression, operates as a spacer between the upper and lower side walls or segmental portions of the ring, and is also a spring flexing means which, when the ring is compressed, provides tension, tendency of which is to enlarge the ring as far as it will go, causing it to bear against the engine cylinder wall.

The ring of my invention adapts itself to be made in narrow widths for compression rings having no ventilation, or the ring may be ventilated and made in widths suitable for oil rings. In my invention there is also provided a positive support of the small gaps between the numerous segments of the ring, there is greater side wall radial depth resulting in greater area of ring bearing within a ring groove, and the ring is very economically manufactured. There is provided a universal design suitable for both oil and compression piston rings, free from objectionable distortion or buckling when compressed to operating diameter. The range of dimensions for manufacturing piston rings of this type is also increased, including narrow compression rings in a width, at a minimum of $\frac{3}{32}$ inch and larger, oil rings of a width of $\frac{1}{8}$ inch and larger, in all diameters.

An understanding of the invention may be had from the following description, taken in connection with the accompanying drawings, in which:

Fig. 1 is a somewhat enlarged, fragmentary plan showing the ring in its first step of production made from a continuous ribbon of steel of suitable width and gauge.

Fig. 2 is a fragmentary plan similar to Fig. 1 when the ring is to be a vented oil passing ring, the ring to be produced, in Fig. 1, being a compression ring.

Figs. 3 and 4 are respectively vertical sections on the planes of 3—3 and 4—4 of Figs. 1 and 2, looking in the direction indicated.

Fig. 5 is a somewhat enlarged, fragmentary plan of the ring, showing the formation of the spring connectors between the successive segments of the ring and before the ring lands have been bent to final position.

Fig. 6 is a view similar to Fig. 5 with the segmental ring lands in their final position.

Fig. 7 is a plan view of the complete ring, parts being omitted between dash line indicated inner and outer diameters thereof.

Fig. 8 is a fragmentary, vertical section through a compression ring showing the same installed in the ring groove of a piston and bearing against a cylinder wall, and Fig. 9 is a similar section of an oil vented ring made in accordance with my invention.

Like reference characters refer to like parts in the different figures of the drawings.

From an elongated strip of sheet metal, preferably steel, indicated as 1 having proper width and thickness, the lands 2 of the ring segments are cut, with narrow connectors 3 between successive pairs of lands which, at each end portion, are severed from the lands leaving an integral connecting part 4 between the lands of each pair of lands considerably less in width than the width of such lands. When the ring is to be used as an oil ring, the connectors are of greater width, and each may have a slot 5 therein, or other equivalent openings for oil passage, as shown in Fig. 2

The connectors 3 are shaped into loops of the form best shown in Fig. 5. From one end of a conecting section 3 it is formed into a generally arcuate portion 6, extending outwardly, thence continued in a section 7 parallel to the plane of the lands 2 and, therefrom, in an inclined section 8 which reaches to the inner side of the next succeeding part 4, and terminates in a section 9 bent back upon the connecting portion 4 between the lands of each pair of lands by a full semi-circular bend as indicated at 10.

The ring is completed by turning the lands 2 at right angles to the connectors 4 between them to lie, one against each of the edges of the loops comprising the parts 6 and 7. The inclined sections 8 across the partings or division lines between the adjacent ends of the successive lands 2. The completed ring is shaped to a substantially circular form, as in Fig. 7, the ring being parted at one side.

When a ring either of the compression type or of the oil type, as shown in Figs. 8 and 9, respectively, is placed within a groove of a piston 11, the outwardly extending upper and lower lands 2 at their outer edges bear against the cylinder wall 12. The ring at the parting is closed, the ring ends abutting against each other. The ring, when installed in a cylinder, is circumferentially compressed, the connecting loops between successive segment pairs being strained, and tension developed therein, while the ends of adjacent lands 2 are brought closer together.

With such ring construction the lands of the ring are supported substantially from one end thereof to the other as best shown in Fig. 7 and the ring is maintained against buckling or "snakiness," being held in line so that the upper sides of the lands 2 do not bear with pressure which would produce frictional resistance to the free inner and upward movements of the ring in service. The connecting loops of the type shown and described not only maintain the ring flat and straight within the ring groove, insuring free performance of the ring, but there is requisite tension which maintains the outer edge portions of the lands against the cylinder walls at all times. Such loops also provide a substantially continuous spacer between the opposite lands of the ring.

The ring is economical to produce, easily installed and can be made of any sizes required and of any diameter for both compression rings or oil rings. The only difference between the oil and compression rings is that an oil ring groove is wider than a compression ring, therefore the connecting loops have the necessary width for the oil passing openings therethrough.

The invention is defined in the appended claims and is to be considered comprehensive of all forms of structure coming within their scope.

I claim:

1. A piston ring of generally circular form comprising, a connected series of segments, each having two spaced parallel lands and an integral connecting member at and between the inner edges of said lands, and connecting loops between successive land connecting members integrally joined, each at one end to one side edge of a connecting member, thence bearing against the inner side of the land connecting member to which connected and therefrom extending outwardly between and lengthwise of the lands connected with said connecting member, therefrom between the lands of a next adjacent segment to the inner side of and spaced from the connecting member connecting said last mentioned lands, and integrally connected at its other end to the edge of said last mentioned connecting member opposite the edge of the first mentioned connecting member to which said loop is joined at its first mentioned end.

2. A piston ring as in claim 1, said connecting members between the lands of each of said segments having a width less than the length of said lands, said connecting loops, at their end portions at the side edges thereof being severed from the lands from the ends of the lands to the connecting members between the lands.

3. A piston ring of generally circular form comprising, a connected series of successive segments, each segment having two spaced parallel lands and an integral connecting member at and between the inner edges of said lands, and connecting loops integral with and extending between successive land connecting members joined at one end with one edge of one connecting member and at its other end with the opposite edge of a next adjacent land connecting member, each of said loops extending across two adjacent connecting members, at the inner side of one thereof and at the outer side of the other.

4. A piston ring of generally circular form comprising a connected series of successive segments, each segment having two spaced parallel lands, and an integral connecting member at and between the inner edges of said lands, and connecting loops integral with and extending between successive land connecting members, each integrally joined at one end with one edge of a land connecting member and at its other end with the opposite edge of a next adjacent connecting member, each of said loops at one end portion and for the major portion of its length being located outwardly of said connecting members, and at its opposite end portion thereof at the inner side of the adjacent connecting member.

5. A piston ring of generally circular form comprising, a connected series of successive segments, each segment having two spaced parallel lands and an integral connecting member at and between the inner edge portions of said lands of each segment, and a connecting loop integrally joined at one end thereof with an edge of each connecting member and curving outwardly therefrom toward but located inwardly of the outer edges of said lands, thence extending circumferentially between associated lands and thence angularly across the separation space between an end of said lands and the adjacent ends of the next successive lands to the inner side of the connecting member between said next successive lands, each of said loops at its other end having integral connection with the opposite edges of the last mentioned connecting members, the curved portion of loops being located closely adjacent the angular portions of next adjacent loops, and all the loops located in circumferential alignment around the ring.

HOLLY M. OLSON.

References Cited in the file of this patent

UNITED STATES PATENTS

| Number | Name | Date |
|---|---|---|
| 2,290,321 | Engelhardt | July 21, 1942 |
| 2,517,225 | McFall | Aug. 1, 1950 |
| 2,521,300 | McFall | Sept. 5, 1950 |